E. S. HALSEY.
INDIVIDUAL OFFICE HEAT REGULATING SYSTEM.
APPLICATION FILED JULY 12, 1909.
1,191,694.
Patented July 18, 1916.
2 SHEETS—SHEET 1.
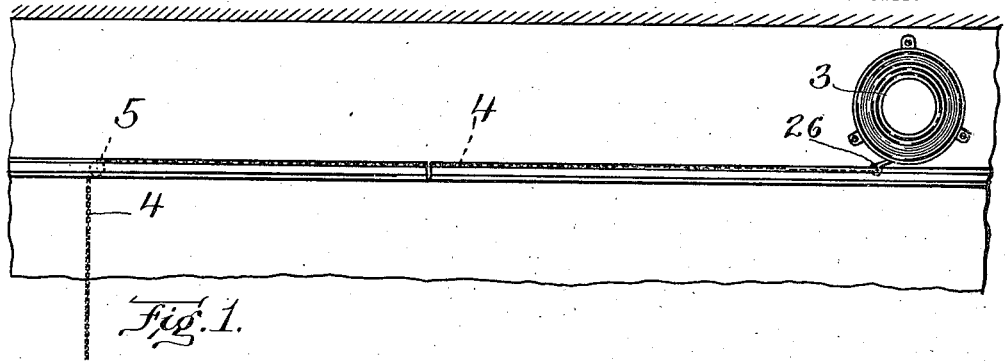
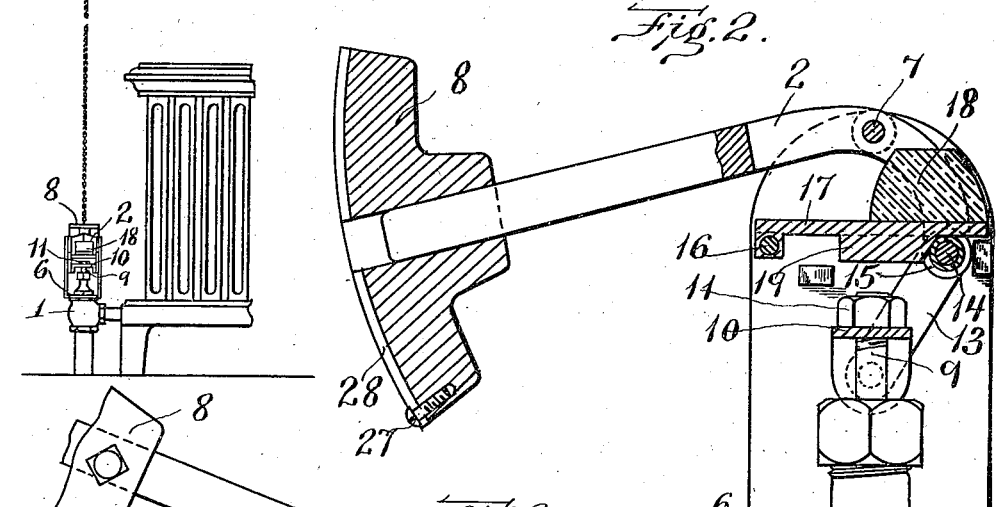
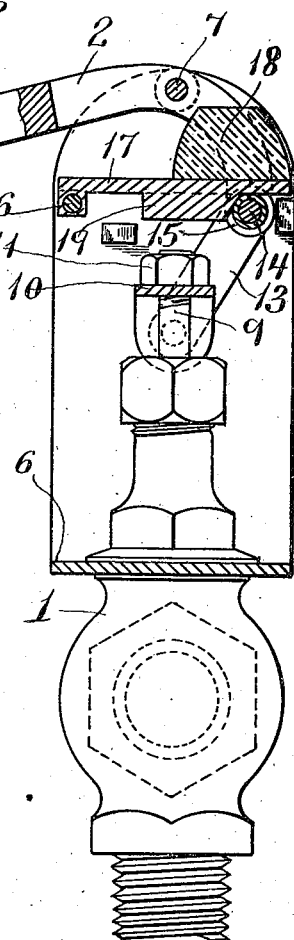
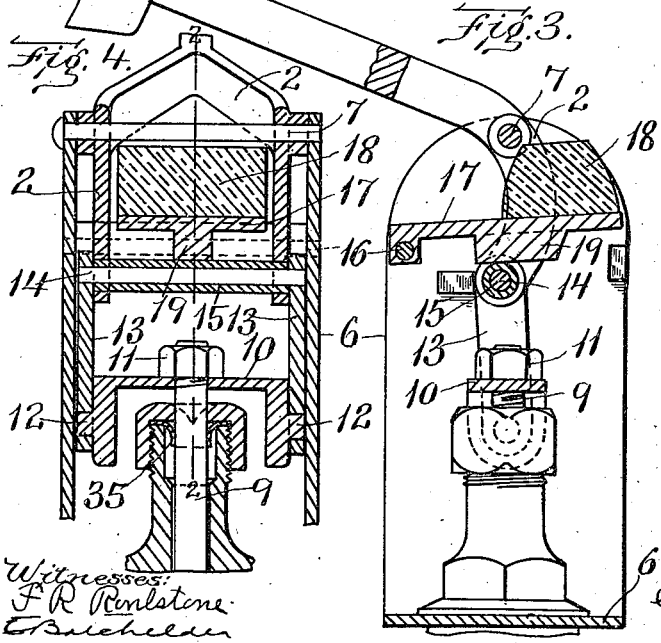

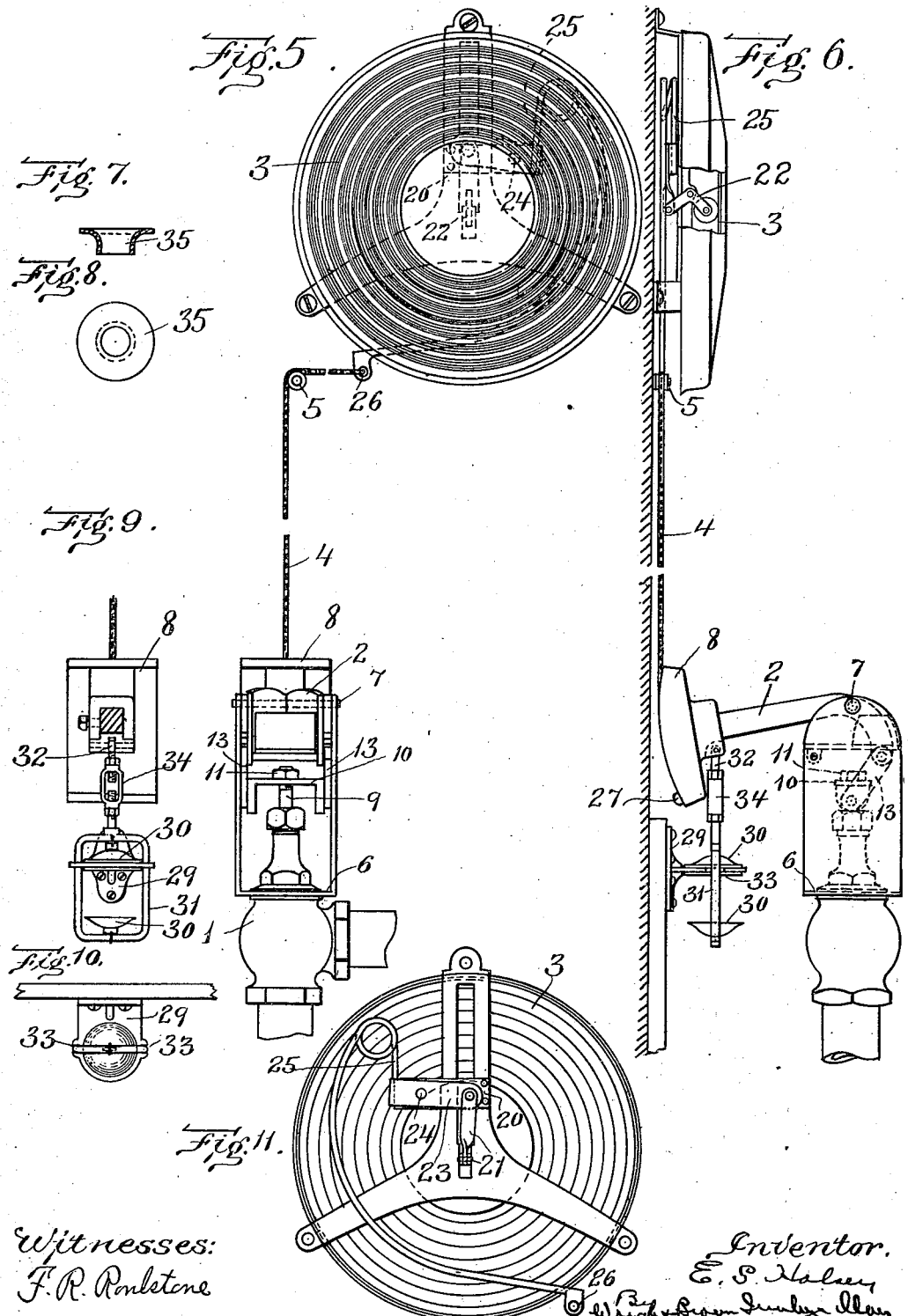

UNITED STATES PATENT OFFICE.

EDWARD S. HALSEY, OF LYNN, MASSACHUSETTS, ASSIGNOR TO HALSEY MANUFACTURING CO., OF WILMINGTON, DELAWARE, A CORPORATION OF DELAWARE.

INDIVIDUAL-OFFICE-HEAT-REGULATING SYSTEM.

1,191,694. Specification of Letters Patent. Patented July 18, 1916.

Application filed July 12, 1909. Serial No. 507,071.

*To all whom it may concern:*

Be it known that I, EDWARD S. HALSEY, of Lynn, in the county of Essex and State of Massachusetts, have invented certain new and useful Improvements in Individual-Office-Heat-Regulating Systems, of which the following is a specification.

All systems of temperature regulation as formerly applied to large structures of the office building class in which each of the small rooms is provided with its individual radiator, usually steam heated, have been of such a nature that the power which turned the radiators on and off was supplied from a compressed air plant in the engine room or elsewhere and being supplied to these steam valve operating motors in each of the rooms scattered throughout the building by an intricate system of piping. The thermostat located in each room simply controlled the air pressure supplied to its respective motors.

The complications are further increased and also the cost of installation and maintenance where the thermostat is electrical by an intricate system of wires and batteries. With such a system if the air pressure fails or there is any failure in the electrical system the whole regulating system is thrown out of operation. With my individual room regulating system I completely overcome these objectional features by the particular application and design of my thermostatic motor (similar to that described in my Patent No. 916861 of March 30th 1909) adapted to operate the radiator valve with which it is connected directly by a chain or other flexible ligament.

My object is to provide a more simple cheap and dependable regulating system for this class of work and one that will not require the tearing up and the special piping and wiring of an old building in which it may be installed and one that is self-contained with absolutely no expense for upkeep or attendance.

Referring to the accompanying drawings which illustrate my invention similar numerals refer to similar parts throughout the several views, in which—

Figure 1 shows the complete layout of the system. The thermostatic motor fixed to the wall of an apartment near the ceiling with its flexible tension ligament passing along behind the picture molding over an angle pulley and down to the weighted lever of the radiator valve. Fig. 2 is a side elevation of the special radiator valve in partial section through the lever mechanism and housing on line 2—2 of Fig. 4, showing it in the open position when the weighted operating lever is depressed. Fig. 3 gives the same view and section through said mechanism and housing but showing it in the closed and locked position. Fig. 4 is a front elevation of Fig. 3 in cross-section through 4—4. Figs. 5 and 6 are respectively a front and edge view of the thermostat showing in dotted lines the special lever mechanism I have devised for this system while Fig. 6 also shows the connection to the radiator valve. Figs. 7 and 8 show a plan and a side cross-sectional view of a special frictionless packing washer for the valve stem. Fig. 9 is a front elevation of the buffing attachment in partial cross-section while Fig. 10 is a plan looking at the bottom of same, while the application of the device is shown attached to the weight in Fig. 6. Fig. 11 is a rear elevation of the thermostat shown in Fig. 5.

Going into detail the radiator valve 1 is designed to operate with an instantaneous action and having a locking device at both the open and closed positions to especially adapt it for steam, but it can be used for hot water, either with or without the appliance of instantaneous action. This special valve mechanism is designed as an attachment to the ordinary valve of the globe type that may be already on the radiator without removing the valve from its connections. By simply unscrewing the regular bonnet and stem from the valve and introducing the new bonnet and stem with the old valve disk attached if desired by first passing them through a large opening cut through the bottom plate of the frame 6; which frame with its lever mechanism is thus firmly clamped down to the body of the valve by screwing the bonnet into place. This frame 6 it may be observed is formed up from a wide strip of sheet metal about ¼th of an inch thickness, its two upward bent ends are formed semi-circular and are pierced close to their extremities by a hole for a rock pin 7 for the forked lever 2 which is provided at its outer end with the weight 8.

The top of the valve stem 9 is threaded and fitted with the light somewhat elastic cross-yoke 10 and the locknut 11 to hold it in place after the stem has been adjusted to seat the valve properly. The two downward pointing arms of said yoke are fitted with outward pointing rocker studs 12 and 12 provided for the lower ends of the two short connecting links 13 and 13. The two upper extremities of said links are pivoted on and connected by the long pin 14 to the two short forked ends of the lever 2, thereby creating an elbow joint the travel of which is so stopped that its maximum travel when the valve is seated has to be slightly past center, thus assuring a locked position established by the high lateral pressure of the seated valve stem resultant from the concentration of force of the straightened position of the elbow joint. This pressure is so adjusted by the threaded valve stem as to give a locking or supporting effort to the weighted lever 2 equal to about ¾ of the total gravity thereof so that as long as the tension of the operating ligament 4 is equal to ¼th or more of said weight it will not fall and open the valve. The center pivot or pin 14 of the elbow is equipped with a metal roller 15. Between the two upper ends of frame 6 pivoted in the holes at 16 in their back edges and lying just above said roller is a horizontal plate 17 laden at its front edge with a heavy weight 18. This hinged weighted piece 17 is equipped on its underside with a thick metal piece 19 with its outward end slightly beveled which acts as a catch for engaging the roller 15 and locking the valve in the open position, when the weighted operating lever 2 descends. Said locking device is so designed and adjusted that it will not release the lever mechanism until the spring tension (described below) on the operating ligament 4 has accumulated sufficiently to carry and restore said weighted lever by said tension and the inertia imparted to said weight thereby to the previously described closed and locked position shown by Figs. 3 and 4.

The thermostatic motor 3 which automatically generates the power for operating the radiator valve is constituted by a circular expansible diaphragm chamber constructed of two corrugated dished, flanged disks fitting one within and close against the other hermetically sealed together about their peripheries. The inner or back disk is the thinner of the two so that it is readily flexed outward by the internal pressure generated by a small quantity of a volatile liquid sealed in between the disks thus constituting a flexible actuating diaphragm. This diaphragm has fixed at its center a circular stiffening plate; across the back of the diaphragm is a rigid Y shaped cross piece or yoke. All of the aforesaid features of the motor being identical with those described in my patent above referred to, but in carrying out my present invention I have devised a different lever system to meet the requirements of this case as is here particularly shown and described.

Fixed to the rigid Y shaped cross piece is a flat extension piece 20 to which is pivoted the short flat lever 23 by means of the shoulder screw 24. A bell crank 22 is centrally pivoted in said cross frame so as to make working connection with the center of the stiffening plate of the actuating diaphragm by means of a friction wheel pivoted in one of its extremities; the other end of said crank is connected to one end of lever 23 by the pivoted connecting link 21, all so designed and proportioned that with the full travel of the actuating diaphragm the connecting bell-crank and lever 22 is rocked up and down equidistantly from the horizontal position. Sweated into a hole drilled into the other or short end of the flat lever 23 is a stiff spring wire 25 which after being coiled on itself one and a half turns is brought around and out in a large arc or bow from under cover of the diaphragm chamber where it terminates in an eye 26. Thus contorted wire constitutes the long and very elastic end of a motion transmitting and multiplying lever of which the arm 23 is the short and driving end. The power is transmitted from the outer end of this lever to the weighted valve lever 2 by a wire secured in its eye 26 and passing along in the groove of the picture molding to a point close to the angle pulley 5 where it connects with the chain which passes over the said pulley and down the wall where it is connected to the weight 8 by the screw 27 so as to lie in the groove 28 of the curved back of said weight which allows it to work straight up and down uniformly close to the wall.

Now to give a review of the complete device let it be assumed that the temperature of the room is below normal that the diaphragm is therefore collapsed and the valve lever 2 depressed and locked by the beveled end of latch 19 engaging friction roller 15 thus holding the valve open. As the heat from the radiator raises the room temperature to normal the volatile liquid within the thermostat boils developing a pressure which expands the diaphragm against the friction wheel of the bell crank which in rocking on its pivot moves the lever 23 which in turn flexes the storage spring 25 until sufficient stress and energy have been accumulated, restrained by the ligament 4, held by the latch 19, to cause the roller 15 to abruptly lift the weight 18 by its pressure against the bevel face of said latch thus liberating the accumulated force. Thereupon the stored energy of the spring expands itself in suddenly raising the weight to its maximum: its gathered momentum being more than sufficient to force the elbow joint past center (where the movement is arrested by a buffer) thus locking it in the closed position with the weight 8 supported as shown in Figs. 3 and 4.

Now since the source of heat is cut off, the room temperature drops, the thermostat's vapor condenses, the diaphragm collapses, withdrawing its support from the valve weight; the balance of weight finally becoming too much for the supporting stress of the elbow joint offset, it is finally forced over center allowing the weight to drop to its former opposite position shown in Fig. 2, where its motion is again arrested by the buffing device which will now be explained. This buffing device is designed double acting to arrest and determine the travel of the weight 8 in both directions to take the shock in a way that will be nearly noiseless and also prevent any rebound. The fixed element or stop is in the form of a bracket 29 screwed to the baseboard of the wall below weight 8, the two flaring metal buffer disks 30 and 30 mounted at their centers at each end of the loop frame 31 both face the stop bracket 29. The plain top and bottom faces of said bracket are faced with smooth leather, sheet rubber or similar material, cemented to it, so that when the slightly flexible concaved buffer disk strikes it their peripheries will make perfect contact and be slightly air-cushioned and in so doing drive out a portion of the air and create a partial vacuum upon the attempted rebound which will be prevented thereby. The connecting rod 32 is pivoted in the neck of weight 8 at such a point relative to the two guide holes 33 and 33 in plate 29 that it is plumb at both extremities of travel when the buffer disk strikes.

To further assure the true seating of the disks they are bound with wire to the frame 31 so that they can slip sufficiently to adjust themselves in position. To get the exact adjustment of the stop positions the turn buckle 34 with right and left threads is provided in the connecting rod 32 which is held in position by a locknut.

The most desirable interior temperature to be maintained as is universally prescribed and acknowledged by the public at large is 70 degrees F. The temperature of all artificially heated rooms varies from $\frac{3}{4}$ of a degree to two degrees per foot in height between the floor and ceiling varying with the manner and intensity of heating and the general dissipation of said heat through the walls of the rooms.

Under average circumstances the difference will probably be about $1\frac{1}{4}$ degrees per foot or nearly 12 degrees for the average room of $9\frac{1}{2}$ feet. For this reason it is universal practice to both register and recognize the standard temperature of 70 degrees F. as at the convenient and average height of about $4\frac{3}{4}$ feet from the floor.

In the summer time when there is no artificial heat within an apartment from radiator, lamp or gas the temperature between the ceiling and floor has a chance to equalize itself so that there is practically no difference between them, but when the room is cool and the steam is suddenly turned full on the radiator, the heated air rises quickly to the ceiling and by the time the temperature at the standard height of the thermometer has risen to 70 degrees the temperature at the ceiling will be from 78 to 80.

In working out my present system of temperature regulation in which the thermostat itself has absorbed enough energy from the room temperature to directly operate the regulator valve I have taken advantage of this tendency of the heat to most rapidly accumulate in the upper part of the room by locating my thermostat there instead of at the universal height of about $4\frac{1}{2}$ to 5 feet. By this means and by using a liquid in my thermostat that boils at $73\frac{1}{2}°$ F. monochloropropylin ($C_3H_5Cl$) by the time the thermometer indicates 71 degrees or a little more the thermostat will have reached its limit of action (as about 5 degrees change is required for complete dilation) and will have shut off the radiator and its ascending currents of warm air whereupon the tendency of the room temperature to equalize itself by the law of diffusion immediately establishes itself the lower half of the room gaining some in temperature while the upper part loses more rapidly so that by the time the temperature at the thermometer has dropped to 70° it will have dropped to $73\frac{1}{2}$ or less at the thermostat whereupon it will have collapsed sufficiently to have turned off the steam. By these means I have been able to develop a simple, inexpensive, reliable automatic system which will regulate within very narrow limits and without any outside source of energy.

Of course to assure the sensitive workings of the device the whole system must be as free as possible from friction and as the ordinary valve stem packing was the cause of the greatest amount of friction I have discarded it and have devised a special nearly frictionless packing collar indicated by 35 in Fig. 4. This packing collar is formed from a thin washer of some flexible semiplastic material such as soft flexible vulcanized fiber preferably a little under $\frac{1}{32}$ in thickness. This washer is first softened by soaking in alcohol or other suitable liquid then pressed in a die to throw out a short neck with curved shoulders so as to form a slightly elastic semi-plastic collar to closely fit the valve stem which will be kept in the semi-plastic state by the moisture and will be kept in form and contact with the stem by the low stem pressure.

It is obvious that it is not essential that the lever 25 of the thermostat should be of elastic construction as the same function would be performed equally well if the requisite elasticity lay elsewhere in a transmitting medium such as a spiral spring inserted in the connecting chain 4.

Having described my invention I claim:—

1. The combination with a radiator having a valve, a thermostat containing a quantity of volatile liquid and having a wall movable by expansion of the vapor of such liquid, and a direct operating connection between the thermostat and valve, whereby the opening and closing of the valve is directly effected by the thermostat, said connection including a weighted lever having an inflexible link connection with the valve, and a flexible ligature connected to said lever.

2. In a temperature regulating system, a heat regulating valve, a thermostatic motor, a lever having connections for opening and closing the valve and tending to open the valve, a ligament connecting the lever and motor whereby the motor may operate the lever in one direction, and means for locking the valve in closed position until released by the action of said motor.

3. In a temperature regulating system, a heat regulating valve, a thermostatic motor, connections between said motor and valve whereby the former will actuate the latter, and means other than said motor for automatically and rigidly locking the valve in either closed or opened position.

4. In a temperature regulating system; a steam valve designed to move continuously from one extremity of its travel to the other; a thermostatic motor adapted to operate said valve; an elastic medium for transmitting the power and motion from said motor to the operating mechanism of said valve; a device for restraining the action of said elastic medium to cause the power developed by said motor to be gradually accumulated and stored in said elastic medium until sufficient in amount to automatically release itself, and connections whereby said valve will be operated to the opposite extremity of its travel when the power is released, and latching devices to hold the valve when so operated.

5. In a temperature regulating system; a steam radiator within a room it is designed to heat; a valve for said radiator; a thermostatic motor within said room designed to govern its temperature by operating said valve; a yielding resilient medium communicating the power and motion from said motor to the operating mechanism of said valve and an automatic device for locking and releasing said valve for the purpose specified.

6. In a temperature regulating system; a steam radiator within a room it is designed to heat; a valve for said radiator; a thermostatic motor located in the upper portion of said room designed to govern its temperature by operating said valve; an elastic yielding medium communicating the power and motion from said motor to the operating mechanism of said valve; and an automatic displaceable means for locking said valve against the force applied to said medium for the purpose set forth.

7. In a device of the character described, a steam valve having a sliding stem equipped on its inner end with an aperture closing disk; a rigid frame 6 fixed to the body of said valve and projecting from it approximately parallel with said stem; an elbow joint created by the ends of two short arms being pivoted together the other end of one of said arms being in pivotal connection with the other end of said stem and the outer end of the second of said arms being pivoted to the outer end of said frame in line with said stem so that the straightening of said elbow will force said stem into the valve and rigidly seat said disk when said joint is straightened; and an operating lever fixed to one of said joint arms.

8. In a temperature regulating system a self-locking steam valve; a weighted operating lever 2; an elbow joint gearing said lever to said valve so arranged as to forcefully close said valve with increasing pressure as said joint is straightened becoming rigidly seated and locked when said joint passes over center.

9. In a temperature regulating system a radiator including a valve; having a sliding stem 9; an operating lever; an elbow joint connecting the outer end of said stem to said lever; a fixed frame 6 for pivoting said lever; a suitable stop for said lever mechanism to arrest its motion directly after said joint passes center thereby rigidly locking said stem in the closed position; and a suitable automatic latch for restraining said lever mechanism in the reverse or angular position when open.

10. In a temperature regulating system a quick acting steam valve; having a sliding stem 9; an operating lever 2; an elbow joint constituted by a short arm or link 13 pivoted with the short arm of lever 2 for working said stem a weighted latch 19 for restraining the working mechanism in an open position and a rigid frame 6 for pivoting said mechanism.

11. In a temperature regulating system a self-locking steam valve having a sliding stem 9 an operating lever 2 for said stem fulcrumed at a point in line with it; the short arm of said lever being so geared to the outer end of said stem as to thrust it inward to the closed position with a gradually decreasing velocity and increasing purchase so adjusted as to forcefully seat and rigidly hold said stem in the closed position by the said short arm upon its assuming a straightened position in line with its fulcrum and said stem.

12. In a device of the character described, an instantaneously operating self-locking steam valve having a sliding stem 9 an operating lever 2 for said stem fulcrumed at a point in line with it; the short arm of said lever being so geared to the outer end of said stem as to thrust it inward to the closed position with a gradually decreasing velocity and increasing purchase so adjusted as to forcefully seat and rigidly lock said stem in the closed position by the said short arm upon its assuming a straightened position in line with its fulcrum and said stem; a fixed U shaped frame 6 for the pivoting of said lever mechanism having a sufficiently large hole through the center of its yoke for the threaded neck of the valve bonnet to pass down through and firmly clamp it to the body of the valve when said bonnet is screwed into place in the valve.

13. In a device of the character described, an instantaneously operating self-locking steam valve having a sliding stem 9; an operating lever 2 for said stem fulcrumed at a point in line with it; the short arm of said lever being so geared to the outer end of said stem as to thrust it inward to the closed position with a gradually decreasing velocity and increasing purchase so adjusted as to forcefully seat and rigidly lock said stem in the closed position by the said short arm upon its assuming a straightened position in line with its fulcrum and said stem; a suitable means provided for restraining said lever mechanism in the open position; and the short end of said lever being equipped with the friction eliminating roller 15.

14. In a device of the character described, a quick acting steam valve mechanism constructed as follows:—a sliding valve stem 9; a weighted intermediately fulcrumed forked operating lever 2; a dual elbow joint constituted by pivoting the short arms of said forked lever with links 13 and 13 said joint engaging the outer end of said stem to said lever through the medium of the elastic yoke 10; a roller 15 carried by the forked end of said lever; a suitable latch 19 for restraining the valve in an open position; a forked frame 6 for engaging said lever system and suitable stops for arresting the travel of said lever system at the open and closed positions.

15. In a device of the character described, a non-rebounding buffer or stop device for a weighted operating lever of a quick acting valve; said buffer essentially comprising the concave buffer disk 30 centrally mounted so that its periphery strikes squarely with a perfect and elastic contact against the plain smooth surface of a plate 29 so as to cushion by forcefully expelling a portion of the air between their inner surfaces and resist rebound by a momentary partial vacuum created between their surfaces by the recoil effort and airtight contact at the periphery of said disk.

16. In a device of the character described, in conjunction with the valve operating weight 8 a double acting buffer and stop device constituted as follows a hinged connecting piece 32; a flat stop plate 29; two buffer disks 30 and 30 arranged one on each side of said flat piece each facing the opposing faces of said plate and a rigid carrying frame 31 yoking said disks together for the purpose set forth.

17. In a device of the character described, a non-rebounding buffer or stop device for a weighted operating lever of a quick acting valve; said buffer essentially comprising the concave metal disk 30 centrally mounted so that its periphery strikes squarely with a perfect and elastic contact against the plain smooth surface of a plate 29; a thin layer of pliable material between the contact edges of said buffer disk and said plate so as to cushion by forcefully expelling a portion of the air between their inner surfaces and resist rebound by a momentary, partial vacuum created between their surfaces by the recoil effort and airtight contact at the periphery of said disk.

18. In a device of the character described, in conjunction with the quick acting weight 8 a connecting rod 32; a yoke 31 carried by said rod a two-faced stationary stop 29; two metal buffer plates 30 and 30 carried by said yoke impinging on said stop; guide holes 33 in said stop plate; and a layer of pliable material between said stop plate and the contact edges of each of said buffer plates.

In testimony whereof I have affixed my signature, in presence of two witnesses.

EDWARD S. HALSEY.

Witnesses:
  A. W. HARRISON,
  E. BATCHELDER.